US005518027A

United States Patent [19]
Saiki et al.

[11] Patent Number: 5,518,027
[45] Date of Patent: May 21, 1996

[54] VALVE ASSEMBLY

[75] Inventors: Hideya Saiki; Mituyo Nakamura, both of Mie; Takashi Hirose, Yokkaichi, all of Japan

[73] Assignee: NTN Corporation, Osaka, Japan

[21] Appl. No.: 127,502

[22] Filed: Sep. 28, 1993

[30] Foreign Application Priority Data

| Sep. 30, 1992 | [JP] | Japan | 4-261217 |
| Jan. 29, 1993 | [JP] | Japan | 5-002090 U |
| Feb. 26, 1993 | [JP] | Japan | 5-007460 U |

[51] Int. Cl.⁶ ............................ F16K 11/074; F16K 51/00
[52] U.S. Cl. ................. 137/550; 137/625.17; 137/625.4; 251/368
[58] Field of Search ............................ 137/454.2, 454.6, 137/625.17, 625.4, 550; 251/368

[56] References Cited

U.S. PATENT DOCUMENTS

| 3,965,936 | 6/1976 | Lyon | 137/625.17 |
| 4,502,507 | 5/1985 | Hayman | 137/625.17 X |
| 4,687,025 | 8/1987 | Kahle et al. | 137/625.4 X |
| 4,738,281 | 4/1988 | Limet et al. | 137/625.17 |
| 4,846,207 | 7/1989 | Humpert et al. | 137/625.4 X |
| 4,935,313 | 6/1990 | Knapp | 137/625.17 X |
| 5,060,692 | 10/1991 | Pawelzik et al. | 137/625.4 |

FOREIGN PATENT DOCUMENTS 2-190678  7/1990  Japan .

Primary Examiner—John Rivell
Attorney, Agent, or Firm—Marmelstein Murray & Oram Nikaido

[57] ABSTRACT

A valve device which can reliably seal water even after a long continuous use. It has a valve seat made of a hard ceramic having a fluid passage and a valve body made of a self-lubricating polyphenylene sulfide resin and slidably put on the valve seat. Inlet passages are formed in the valve body. The surface of the valve body to be brought into sliding contact with the valve seat is lapped into a flat or crowned smooth surface after swelling the valve body with liquid. Otherwise, the valve seat and the valve body are made of synthetic resins that show no adhesion to each other. The base and the valve seat may be integrally formed. Also, elastic packings may be provided on the end face of the base so as to protrude into the bottom openings of the inlet passages. Small-diameter flanged rings are fixed in position by the elastic packings.

14 Claims, 6 Drawing Sheets

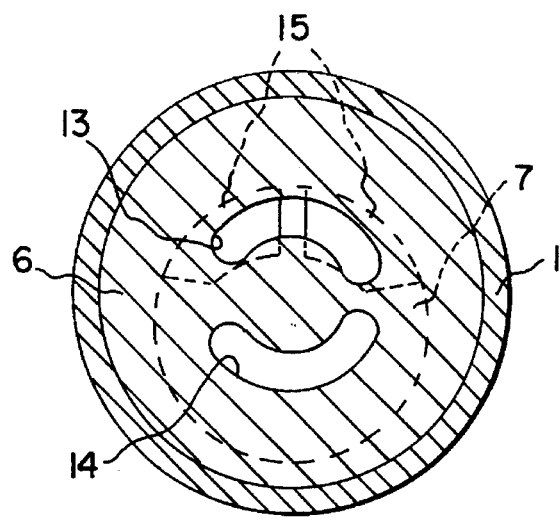
FIG. 3
FIG. 4
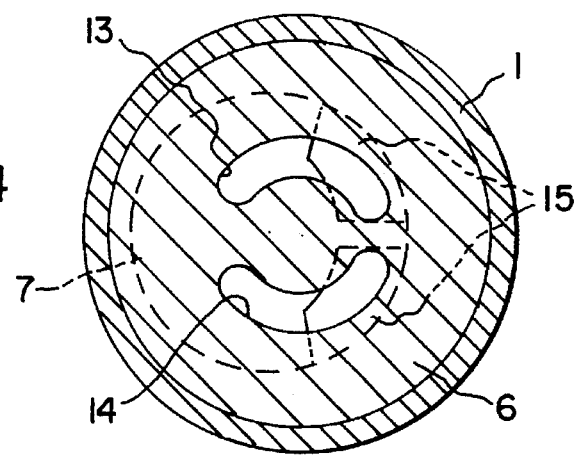
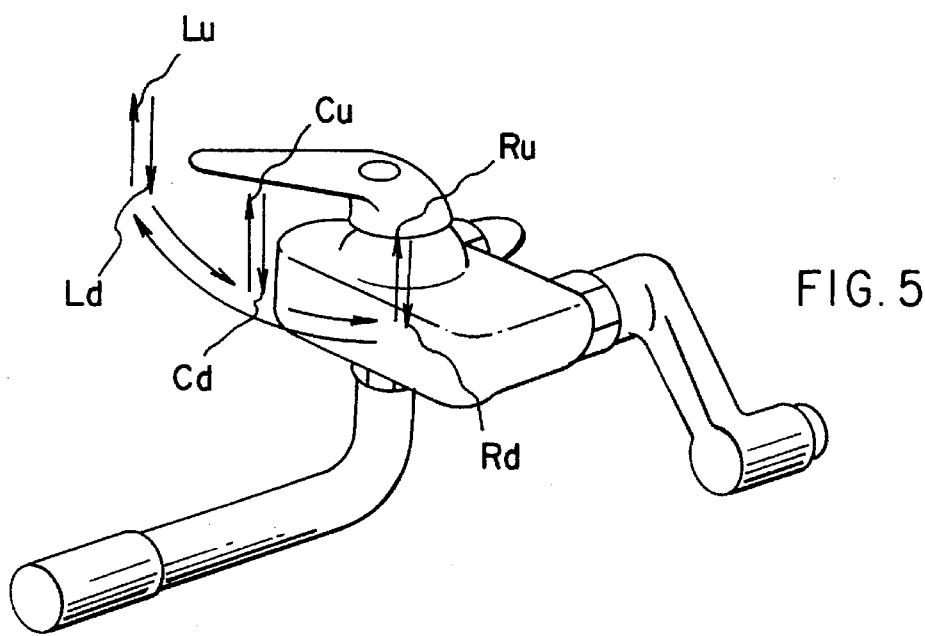
FIG. 5

VALVE ASSEMBLY

This invention relates to a valve assembly for use in a tap water faucet, a faucet for a mixture of hot and cold water or a flow path changeover cock for a cleaner for flushing a toilet bowl with warm water. Such a valve assembly is used to stop the water flow and adjust the flow rate by displacing a valve body with respect to a valve seat.

With reference to FIGS. 1–4, we shall explain a valve assembly for mixing warm and cold tap water. It has a valve housing 1 having a discharge passage 2 and a recess 5. In the recess 5 are mounted, from below, a valve seat 6, a valve body 7 and a seal ring 8 one upon another. A lever holder 9 is rotatably fitted in the top part of the valve housing 1. It carries a lever 10 for actuating the valve body 7.

The valve seat 6 is fixedly mounted on a base 12 by engagement with a protrusion 11 on the base 12 provided around the valve housing recess 5 and is formed with a pair of elongated inlet passages 13, 14 arranged in the shape of Λ (FIG. 2). The passages 13, 14 can be brought into communication with circular inlet passages 3, 4 formed through the base 12.

The valve body 7 is disk-shaped and has a diameter smaller than the inner diameter of the valve housing recess 5. It is slidable relative to the valve seat 6 and the seal ring 8. In its sliding surface with the valve seat 6 are provided flow passages 15 made up of two cutouts communicating with the discharge passage 2.

Between the valve seat 6 and the base 12 is mounted a rubber packing 21. Also, a rubber O-ring 19 is fitted on the top surface of the seal ring 8. By the elasticity of the packing 21 and the O-ring 19, a liquid-tight seal is provided between the base 12 and the valve seat 6, between the valve seat 6 and the valve body 7 and between the valve body 7 and the seal ring 8.

The valve body 7 and the lever 10 are operatively coupled together through a link rod 17 supported on the lever holder 9 by means of a pin 18. By moving up and down and turning the lever 10, the valve body 7 can be moved to a desired position to open the faucet to obtain selectively hot water, cold water or a mixture thereof and to close the faucet.

In the state shown in FIGS. 1 and 2, the valve body 7 is moved to the rightmost end, so that flow passages 15 communicate with neither of the inlet passages 13, 14. In the state of FIG. 3, the valve body 7 is in such a position that the flow passages 15 communicate with one of the inlet passages 13, i.e. the position in which only hot water or cold water is discharged. FIG. 4 shows a position of the valve body 7 in which the flow passages 15 communicate with both of the inlet passages 13, 14, so that a mixture of hot water and cold water is discharged.

FIGS. 11 and 12 show a conventional valve assembly, which has an improved connecting structure between the bottom end face of the base 12 and the faucet body. A ring-shaped rubber packing 16 is fitted in the inlet passages 3, 4. A reinforcing guide ring 20 made of a metal such as stainless steel is fitted in the rubber packing 16.

In such a valve assembly, the ring-shaped rubber packing 16 provides a seal between the base 12 and the valve seat 6 and between the base 12 and the unillustrated faucet body for mixing cold and warm water.

It is proposed in Unexamined Japanese Patent Publication 2-190678 to form the valve seat 6 or the valve body 7 of the valve assembly from a resin composition comprising 35–90% by weight of polyether ketone resin and 10–65% by weight of carbon fiber having an average fiber diameter of 8 μm or less, with an inorganic powder filler such as natural mica further added. There is also known a resin composition comprising 25–80% by weight of polyphenylene sulfide resin and 20–75% by weight of carbon fiber having an average fiber diameter of 8 μm or less (Unexamined Japanese Patent Publication 2-190677).

Such conventional valve assemblies had a problem in that the sliding surfaces of the valve body and the valve seat tend to get swollen and deformed while in use by absorbing water. This may cause water leakage.

One way to prevent water leakage is to form both the valve body and the valve seat from a synthetic resin which is low in water absorption and high in water resistance. But, some types of such resins have a strong tendency to adhere to each other. If the valve body and the valve seat are made of such resins, they will be worn more easily. This reduces their durability and worsens the operability of the valve assembly.

Also, even if the valve seat and valve body can be successfully kept in liquid-tight sliding contact with each other and further the operability of the valve device is satisfactory, this is not sufficient. If no liquid-tight sealing is provided between the valve seat and the base and between the bottom end face of the base and the valve mounting surface or if there is no means to prevent the intrusion of foreign matter into the sliding surface, it is impossible to prevent water leakage.

It is an object of this invention to provide a valve assembly which can provide a sufficient liquid-tight seal in the sliding surfaces between the valve body and the valve seat, which can prevent the valve body and the valve seat from adhering to each other and thus improve the operability and durability of the valve body, which can insure the liquid-tightness between the sliding surfaces of the valve seat and the base and between the end face of the base and its mating surface. In short, the object of the present invention is to provide a valve assembly which is free of water leakage.

According to this invention, there is provided a valve assembly comprising a valve seat formed with inlet passages, a valve body kept in sliding contact with the valve seat and formed with flow passages, the flow passages and the inlet passages being brought into and out of communication with each other by sliding the valve body with respect to the valve seat, characterized in that at least one of the valve seat and the valve body is made of a synthetic resin, is caused to get swollen by absorbing water or oil, and has a sliding surface in the form of a smoothly curved crowning or a smoothly flat surface.

Otherwise, the valve assembly may comprise a valve seat and a valve body which are made of synthetic resins having no adhesiveness to each other.

From another aspect of the invention, the valve body may be made of a synthetic resin having a smaller flexural modulus than the synthetic resin forming the valve seat.

Further, the valve assembly may comprise the valve seat and the base integrally formed of a synthetic resin. The inlet passages may have a large-diameter portion at their lower part leading to a bottom opening of the base, and a flanged ring may be fitted in each inlet passage with its flange buried in the valve seat and its body portion facing the peripheral surface of the large-diameter portion. Also, an elastic packing may be interposed between the peripheral surface of the large-diameter portion and the flanged ring with their bottom end protruding from the end face of the base.

The flanged ring may be provided with a filter at the inner end thereof.

In the first arrangement, the valve seat and/or valve body made of a synthetic resin are caused to get swollen beforehand by absorbing water or oil and has a crowned or flat smooth sliding surface. Thus, the valve body and valve seat would not get swollen and deformed any more, so that the sliding surfaces of these members are kept in liquid-tight contact with each other even after a long use under a water pressure. No water leakage will occur.

In the arrangement where the valve seat and the valve body are made of synthetic resins having no adhesiveness to each other, no compatibility of resins will act between the sliding surfaces of the valve seat and the valve body. Thus, they will never adhere to each other at the sliding surfaces. The wear resistance of the valve seat and the valve body improves accordingly. This tendency will show itself especially markedly if the valve body is made of a synthetic resin having a larger flexural modulus than the valve seat.

In the arrangement wherein the valve seat and the base are integrally formed of a synthetic resin, no water leakage will occur between the valve seat and the base and the number of component parts of the valve assembly can be reduced. In this arrangement, the valve assembly has an elastic member press-fitted in the opening formed in the bottom end of the base so that its bottom end protrudes from the base end face and the flanged ring having its flange portion buried in the base and supporting the elastic member. Since the elastic member is not deformable radially in this state, its elastic force only acts on the bottom end face of the base. Thus, water leakage is prevented positively.

In the arrangement where the flanged ring has a filter on the inner end thereof, the filter serves to positively prevent the intrusion of foreign matter.

Other features and objects of the present invention will become apparent from the following description made with reference to the accompanying drawings, in which:

FIG. 2–4 are cross-sectional views explaining the operation of the valve seat and the valve body of the same;

FIG. 5 is a perspective view showing a faucet for mixed water;

(First Embodiment)

In the first embodiment, at least one of the valve seat and the valve body, made of a synthetic resin, has a flat or crowned smooth sliding surface. The basic structure is the same as described with reference to FIGS. 1–4.

Figure 1:
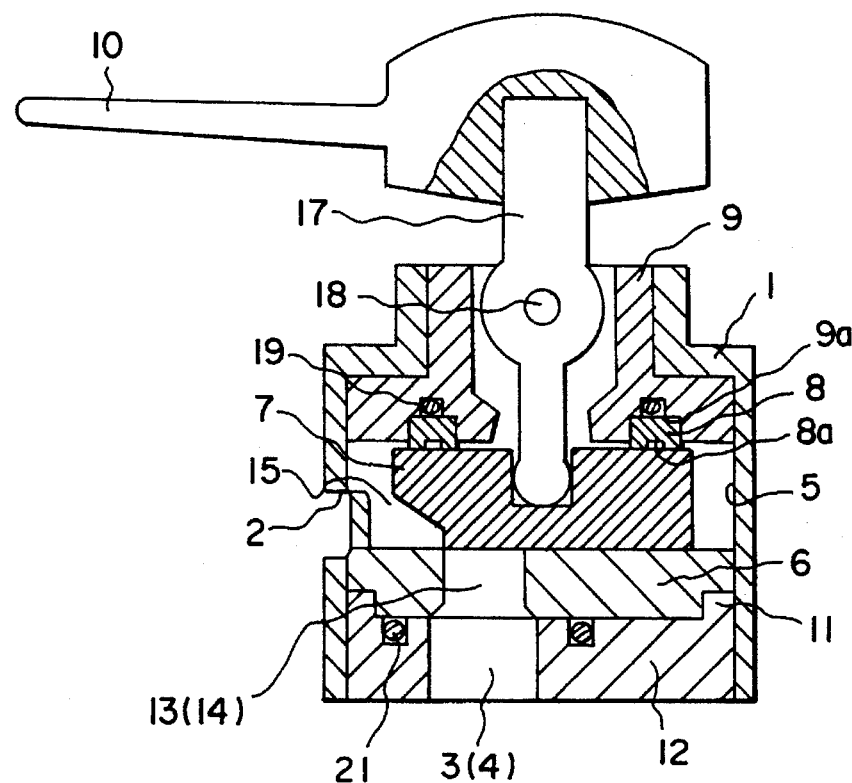
FIG. 1 is a vertical sectional view of the first embodiment.
Figure 2:
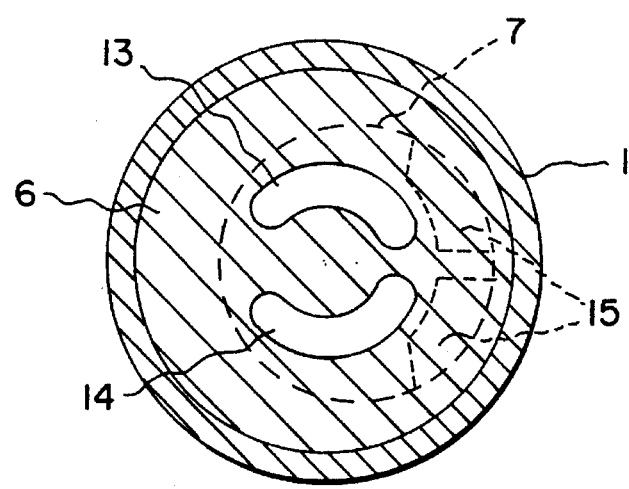

As shown in FIG. 1, the valve assembly of this embodiment has a valve seat 6 and a valve body 7 mounted on the base 12 in the valve housing 1 so as to be disposed one on the other. The valve seat 6 is made of a highly hard ceramic material and has inlet passages 13, 14. The valve body 7 is made of a synthetic resin having self-lubricity. It is in the shape of a disk having a diameter of about 28 mm and having cutouts in its bottom. After allowing the valve body 7 to absorb water and swell, its frictional surface with the valve seat 6 is polished or lapped to provide a mirror-finished surface which may be a flat surface or in the shape of a moderately curved crowning having its central part elevated 2 to 10 microns from its outer edge.

The lever holder 9, which is pivotally supported in the housing 1 at its upper part, is made of a polyacetal resin. A horizontal pin 18 is secured thereto. A link rod 17 and a lever 10 are coupled to the pin 18. The lever holder 9 is provided in its bottom surface with a ring-shaped stepped groove 9a into which are fitted an O-ring 19 and a seal ring 8 made of a ultra-high-molecular-weight polyethylene. A ring-shaped oil-retaining groove 8a is formed in the bottom surface of the seal ring 8. The seal ring 8 and the O-ring 19 are kept in liquid-tight frictional contact with each other. In the alternative, the material for the valve seat 6 may be used for the valve body 7 and vice versa. Also, the sliding contact surface of the valve seat 6 may be a flat smooth surface or a moderately curved crowning.

The valve body 7 may be made of one of the following resin compositions 1)–3).

1) 60% by weight of polyphenylene sulfide resin, 20% by weight of carbon fiber and 20% by weight of mica 2) 50% by weight of polyphenylene sulfide resin and 50% by weight of glass beads 3) 60% by weight of polyetheretherketone, 20% by weight of carbon fiber and 20% by weight of mica The oil used in this invention should be one having a good affinity with the synthetic resin forming the valve body and be capable of infiltrating into the resin, thus swelling the resin just like water. Such an oil may be a silicone oil or a fluorinated oil. Oil should be selected taking into consideration the oil absorption of the synthetic resin.

(Examples 1–3)

Valve bodies 7 were formed by injection molding from the self-lubricating resin compositions 1)–3). They were immersed in hot water of 90° C. for 12 hours. Then the valve body was chucked on an automatic lapping machine (made by NTN Corporation) with its sliding contact surface pressed against its lapping plate and was rotated to polish the sliding contact surface to form it into a moderately curved crowning.

Figure 6A:
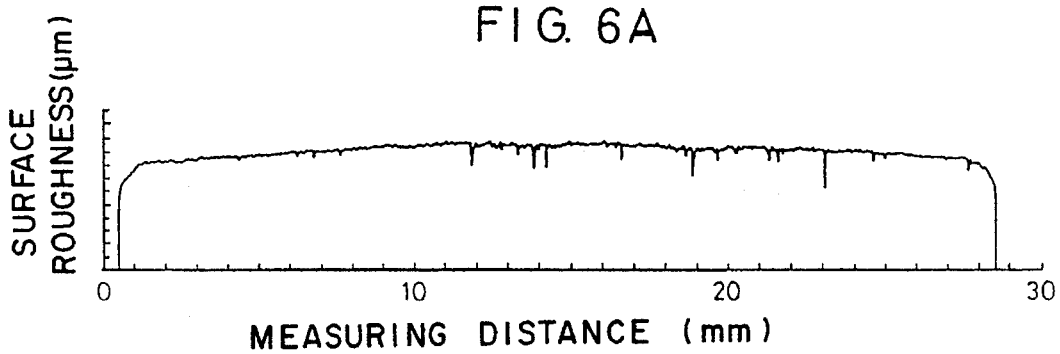
FIGS. 6A–6C are graphs showing the relation between the surface roughness and the measurement distance in the Examples 1–3.
Figure 6B:
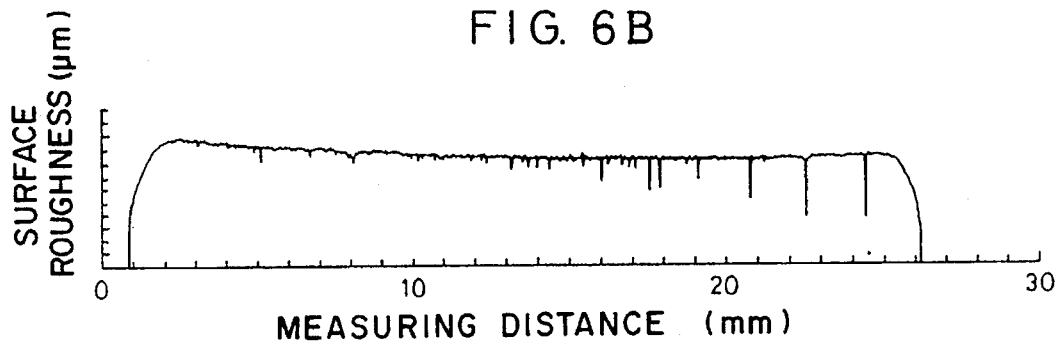
Figure 6C:
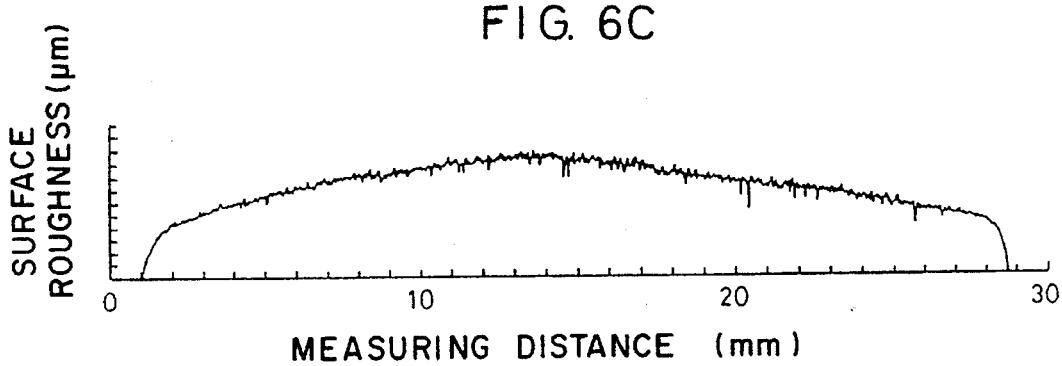

The surface roughness of each valve body 7 was measured with a surface roughness tester (Talysurf 6: trademark) by running a measuring probe in a diametric direction. The results are shown in FIGS. 6A–6C. In Example 1, a smooth crowning was formed with its central part elevated about 3 μm from the peripheral edge. In Example 2, a smooth flat surface was formed. In Example 3, a smooth crowning having its central part elevated about 10 μm from the peripheral edge was formed.

(Examples 4–6)

Valve bodies 7 were formed by injection molding from the self-lubricating resin compositions 1)–3). They were immersed in water of 23° C. for 48 hours. They were then subjected to exactly the same treatments as in Examples 1–3 to form the sliding surfaces.

The valve bodies 7 formed in Examples 1–6 were subjected to the following tests.

(1) Practical Functional Tests:

The valve bodies 7 were subjected to an initial torque test and a water leakage test by bringing them into slidal contact with a valve seat 6 made of an ultra-hard ceramics, using a single-lever type faucet for mixed water made by KVK. In the torque test, torques in a vertical direction (on and off of the valve and flow rate control) and in a lateral direction (water temperature adjustment) were measured with a digital force gauge DFG-2K made by SINPO KOGYO. In the water leakage test, the lever was moved to the center-low position (closed position) and the water pressure was increased to a maximum of 17.5 kgf/cm$^2$ with a pump and the maximum water pressure at which no leakage was observed for one minute was measured.

A single-lever type mixed-water faucet 10 was coupled to only the valve bodies which required no greater torque than 5 kgf·cm and which were capable of stopping water completely at a water pressure of 17.5 kgf/cm$^2$ in these initial tests. Then, as shown in FIG. 5, the lever was moved from the upper right position Ru to lower right position Rd (cold water)→lower left Ld (hot water 90° C.) upper left Lu (closed position)→lower left Ld (hot water 90° C.)→lower center Cd (warm water)→upper center Cu (closed position)→lower center Cd (warm water) lower right Rd (cold water)→upper right Ru (water). This cycle, one cycle about 25 seconds, was repeated 200 thousand times. The torque and water sealability were measured after the 100-thousand-cycles and 200-thousand cycles in the same manner as in the initial tests.

No leakage was observed in the valve assemblies of Examples 1–6 under the maximum water pressure of 17.5 kgf/cm$^2$. Also, the handle torque was low and stable and thus there was no problem in use.

(Comparative Example 1)

Figure 7:
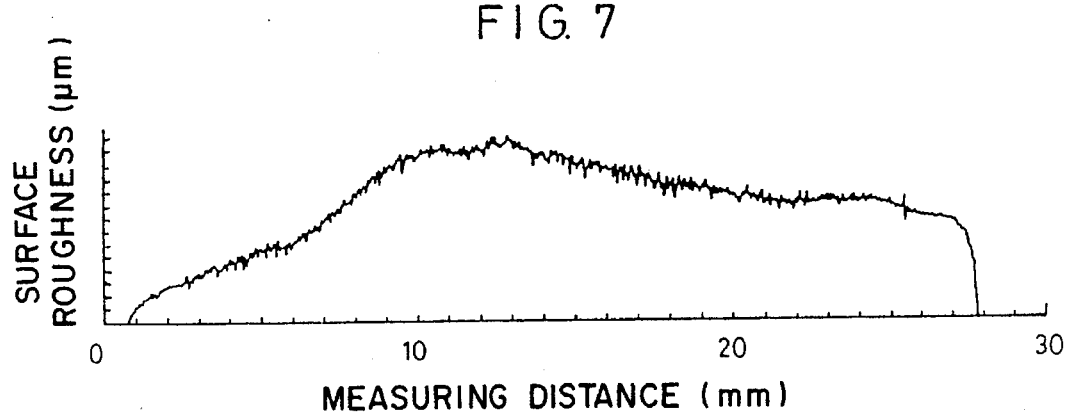
FIG. 7 is a similar graph for the Comparative Example 1.

Valve bodies 7 were formed in exactly the same way as in Example 1 except that they were not allowed to swell with water. These valve bodies were subjected to the 200000-cycle endurance test. Their surface roughness was measured thereafter. The results are shown in FIG. 7.

As a result, it turned out that the valve bodies 7 of Comparative Examples 1 developed deformed surfaces due to swelling by absorption of water.

Further, the valve bodies 7 of Comparative Example 1 were subjected to the same practical functional tests as described above. Leakage was observed at the lower part of the valve assembly when the fluid pressure of 17.5 kgf/cm$^2$ was exerted after a 200000-cycle endurance test.

(Second Embodiment)

Next, description will be made of the second embodiment, which are valve assemblies each having a valve seat and a valve body made of a synthetic resin having no adhesiveness to each other.

The valve assemblies of this embodiment may be made of any kind of synthetic resin. A heat-resistant or a cold-resistant synthetic resin should be selected according to the temperature of the water or other liquid that flows therethrough. Resins having high heat resistance include a polyphenylenesulfide resin (PPS), a polycyanoarylether resin, a polyetheretherketone resin (PEEK) and a polyoxymethylene resin (POM). A polyphenylenesulfide resin is e.g. sold by PHILIPS, USA in the name of RYTON R-4 and a polycyanoarylether resin is e.g. sold by Idemitsu Kosan in the name of ID300.

In the composition forming the resin valve body of the valve assembly of this embodiment, various additives may be added provided such addition will not impair the object of this invention. Such additives include lubricity improvers such as molybdenum disulfide, fluororesins, silicone oils and fluorinated oils, impact modifiers such as glass fibers, boron fibers, wollastonite and potassium titanate whiskers, extenders such as metal, oxides and pigments.

In molding such a resin composition, the abovedescribed materials and various additives are dry-mixed individually or two or more of them at a time in a mixer such as a Henschel mixer, a ball mill or a tumbler mixer. They are then melted and mixed together using heated rolls, a kneader, a banbury mixer or a melt extruder and molded into a predetermined shape.

The molded product thus obtained is subjected to a post-treatment to provide the flatness of its sliding surface. Namely, after roughly adjusting the parallelism and flatness of the molded product with a surface grinder or the like, its surface is polished to the depth of about 10–50 μm with a lapping machine so that at least one of the valve seat and the valve body has its sliding surface mirror-finished to the roughness of 2 μm or less. (Examples 7–10, Comparative Examples 2 and 3)

Valve seats 6 and valve bodies 7 were prepared by injection-molding compositions a)–e) shown in Table 1 (contents in weight %). The valve seats and the valve bodies thus formed were chucked on an automatic lapping machine with their sliding surfaces pressed against its lapping plate. In this state, they were rotated to polish the sliding surfaces to form the valve bodies. The valve bodies and the valve seats a)–e) were combined in pairs as shown in Table 2 and each pair was mounted on a valve assembly of the type shown in FIG. 1.

Each of the valve bodies or valve seats of the composition a)–e) was measured for the flexural modulus before use and the flexural modulus after they absorbed 7% water, which represents a state in use. The results are shown in Table 1.

These valve assemblies (of the same type as a single-lever type mixed-water faucet KM300N made by KVK) were subjected to the same practical functional test as described above to measure the initial torque and the water sealability.

Only those valve assemblies which required not larger torque than 5 kgf·cm and which were capable of stopping water completely at a water pressure of 17.5 kgf/cm$^2$ were subjected to the above-mentioned 200000-cycle endurance test.

In Comparative Examples 2 and 3, in which the valve bodies and valve seats were made of resins having the same main component, adhesion occurred between the sliding surfaces during continuous testing. This caused increase in handle torque and thus abnormal wear. After the 200000-cycle test, leakage was observed at the lower part of the valve assembly when a fluid pressure of 17.5 kgf/cm$^2$ was applied.

In contrast, in Examples 7–9, in which the valve bodies and valve seats having the compositions a)–e) were combined as described above so that the valve body has a larger flexural modulus than the valve seat, no leakage was observed either before or after the test when a fluid pressure of 17.5 kgf/cm$^2$ was applied. The handle torque was as low as not more than 4.8 kgf·cm. Thus, their operability and duration were sufficiently high.

In Example 10, in which the valve body has a flexural modulus larger than that of the valve seat, the handle torque reached 7.5 kgf·cm after the 300000-cycle test, which is a little higher when compared with Examples 7–10. But no water leakage was observed and thus this valve assembly can sufficiently bear practical use.

(Third Embodiment)

Figure 8:
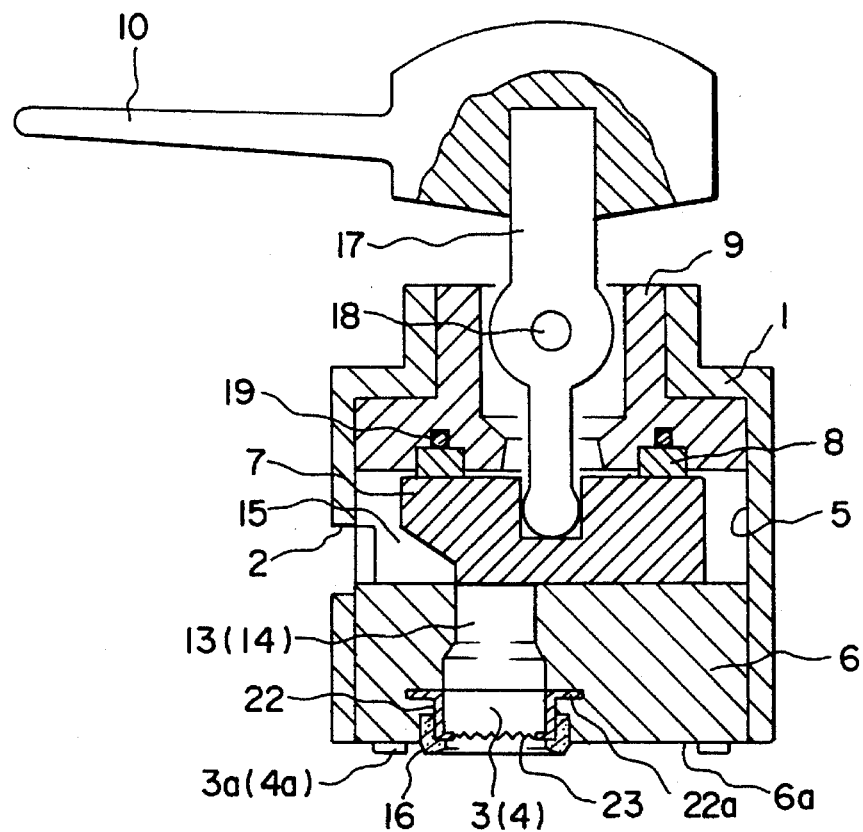
FIG. 8 is a vertical sectional view of the third Embodiment.
Figure 9:
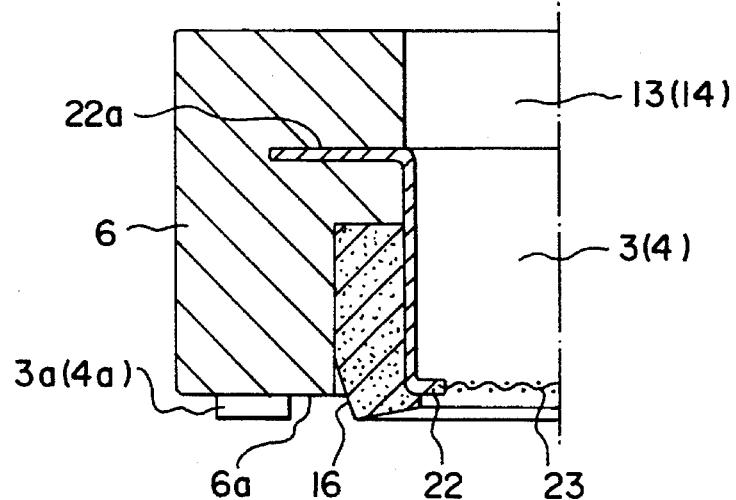
FIG. 9 is an enlarged vertical sectional view of a portion of the same.
Figure 10:
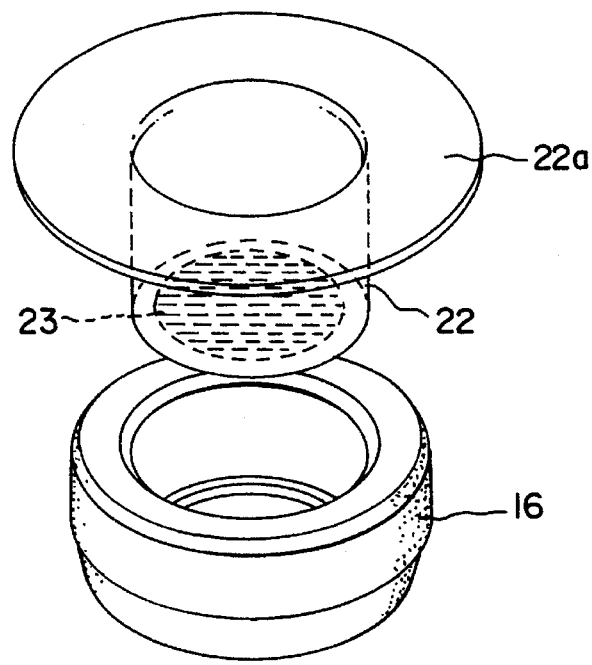
FIG. 10 is an exploded perspective view of the flanged ring and the elastic packing of the same.
Figure 11:
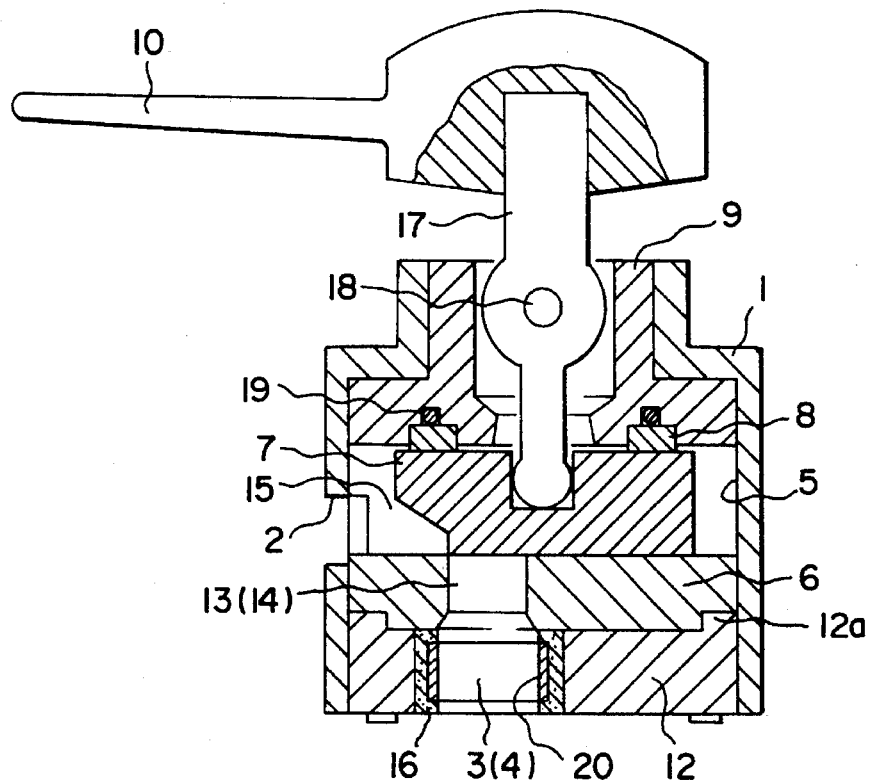
FIG. 11 is a vertical sectional view of a conventional valve assembly.
Figure 12:
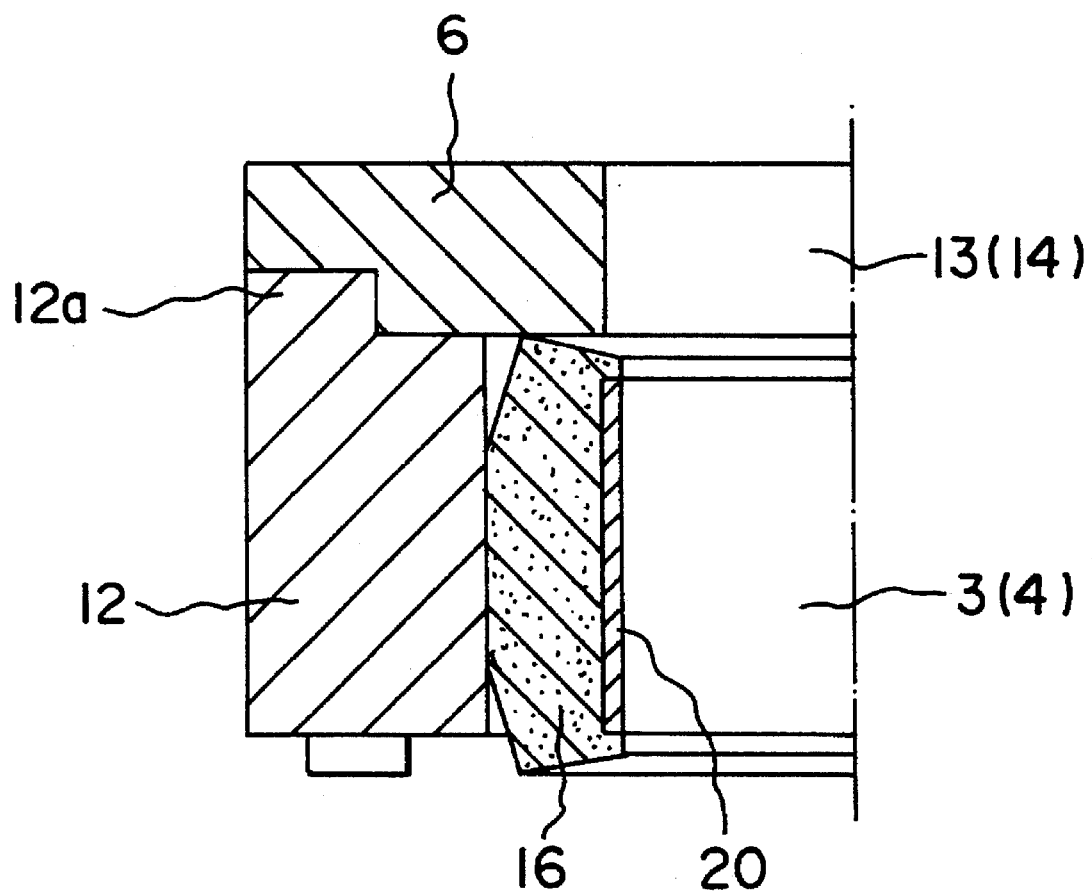
FIG. 12 is an enlarged vertical sectional view of a portion of the same.

FIGS. 8–10 show the third Embodiment in which the valve seat and the base are integrally formed of a synthetic resin.

As shown in FIGS. 8 and 9, in this embodiment, a valve seat 6 integral with a base made of a synthetic resin and having inlet passages 3, 4 is mounted in a housing 1. Rotatably inserted in the top opening of the housing 1 is a cylindrical lever holder 9 having a flange at its lower part and made of a polyacetal resin. In the bottom surface of the flange of the lever holder 9 is formed a stepped annular groove in which are received an O-ring 19 and a seal ring 8 made of an ultra-high molecular-weight polyethylene. A disk-shaped valve body 7 made of resin is disposed between the valve seat 6 and the seal ring 8 so as to be kept in liquid-tight sliding contact with them.

The inlet passages 3, 4 formed in the valve seat (base) 6 have large-diameter portions 3a, 4a at the bottom end. Flanged rings 22 are mounted in the inlet passages 3,4, their flanges 22a being buried in the base and their cylindrical portions facing the inner surfaces of the large-diameter portions 3a, 4a. Elastic packings 16 made of a synthetic rubber are inserted between the flanged rings 22 and the peripheral surfaces of the large-diameter portions 3a, 4a, their bottom ends protruding from the base end face 6a.

The valve seat 6 integral with the base and the valve body 7 may be made of either a heat-resistant or a cold-resistant synthetic resin, the same as used in Examples 7–10 according to the temperature of water or other liquid that flows therethrough and is not limited to any specific type. The valve bodies and valve seats are formed in the same manner as in Examples 1–10.

As shown in FIG. 10, the flanged ring 22 comprises a cylindrical stainless body, a flange 22a formed at one end of the body and a filter (strainer) 23 in the form of a metal net provided at the other end. The flange 22a is buried in the valve seat 6 when melt-forming the latter. The flange 22a may be a single annular member as shown in FIG. 10, comprise a plurality of vanes extending radially or circumferentially from the ring, or comprise rod-like protrusions extending from the ring.

The elastic packings 16 made of synthetic rubber may be sufficiently thin so that they can be press-fitted between the flanged rings 22 and the peripheral surfaces of the large-diameter portions 3a, 4a. Their axial length is so determined that their bottom ends protrude from the base end face 6a.

In Example 11, since the valve seat 6 integral with the base is formed of a synthetic resin, the dimensional accuracy is high and the number of parts used is small. The elastic members 16 can be easily mounted in position simply by pushing them into between the flanged rings 22 and the large-diameter portions 3a, 4a. In this state, the elastic members 6 are restrained against any radial deformation, so that the valve seat 6 and the valve body 7 are brought into tight contact with each other by the elasticity of the elastic members. Thus, water leakage is prevented positively.

By providing the filters 23 in the flanged rings 22, foreign matter hardly comes into the valve assembly through the inlet passages 3, 4. Thus, durable years of the component parts of the assembly can be extended.

TABLE 1

| Component* | | Composition | | | | |
|---|---|---|---|---|---|---|
| | | (a) | (b) | (c) | (d) | (e) |
| Polyphenylenesulfide resin | | 60 | — | — | 60 | — |
| Polycyanoarylether resin | | — | 60 | 60 | — | — |
| Polyetheretherketon resin | | — | — | — | — | 60 |
| Carbon fiber | | 20 | — | — | 20 | 20 |
| Mica | | 20 | — | — | 10 | 10 |
| Silicon nitride | | — | 40 | — | — | — |
| Graphite | | — | — | 40 | — | — |
| Silicon beads | | — | — | — | 10 | 10 |
| Flexural modulus** | At normal time | 3600 | 4100 | 3800 | 2500 | 2360 |
| | When absorbed 0.7% of water | 2500 | 4000 | 3700 | 1700 | 1500 |

*Content in weight %
**Flexural modulus in kgf/mm$^2$

TABLE 2

| Number | Composition | |
|---|---|---|
| | Valve body 7 | Valve seat 6 |
| Example 7 | (a) | (b) |
| Example 8 | (a) | (c) |
| Example 9 | (e) | (b) |
| Example 10 | (b) | (a) |
| Comparative example 2 | (d) | (a) |
| Comparative example 3 | (b) | (c) |

What is claimed is:

1. A valve assembly comprising a valve seat formed with inlet passages, a valve body kept in sliding contact with said valve seat and formed with flow passages, said flow passages and said inlet passages being brought into and out of communication with each other by sliding said valve body with respect to said valve seat wherein in at least one of said valve seat and said valve body is constructed from a synthetic resin that is pre-swollen with water or oil prior to construction of said at least one of said valve seat and said valve body, and has a sliding surface in the form of a smoothly curved crowning or a smoothly flat surface.

2. A valve assembly comprising a valve seat formed with inlet passages, a valve body kept in sliding contact with said valve seat and formed with flow passages, said flow passages and said inlet passages being brought into and out of communication with each other by sliding said valve body with respect to said valve seat, wherein said valve body is made of a synthetic resin of a first type and said valve seat is made of a synthetic resin of a second type wherein said first and second type synthetic resins are different and have no adhesiveness to each other, and wherein said first and second type synthetic resins are selected from the group consisting essentially of a polyphenylene sulfide resin (PPS), a polycyanoarylether resin (PEN), a polyetheretherketone resin (PEEK) and a polyoxymethylene resin (POM).

3. A valve assembly as claimed in claim 2 wherein said valve body is made of a synthetic resin having a smaller flexural modulus than the synthetic resin forming said valve seat.

4. A valve assembly comprising a base, a valve seat mounted on said base and formed with inlet passages, a valve body kept in sliding contact with said valve seat and formed with flow passages, said flow passages and said inlet passages being brought into and out of communication with each other by sliding said valve body with respect to said valve seat, characterized in that said valve seat and said base are integrally formed of a synthetic resin, that said inlet passages each have a large-diameter portion at their lower part leading to a bottom opening of said base, that a flanged ring is fitted in said each inlet passage, with the flange buried in said valve seat and the ring facing the peripheral surface of said large-diameter portion, and that an elastic packing is interposed between the peripheral surface of said large-diameter portion and said flanged ring with their bottom end protruding from the end face of said base.

5. A valve assembly as claimed in claim 4 wherein said flanged ring is provided with a filter at an inner end thereof.

6. A valve assembly as claimed in claim 4 wherein said valve body or said valve seat is constructed from a synthetic resin comprising approximately 60% by weight of polyphelyne sulfide resin, 20% by weight of carbon fiber and 20% by weight of mica.

7. A valve assembly as claimed in claim 4 wherein said valve body or said vale seat is constructed from a synthetic resin comprising approximately 50% by weight of polyphenylene sulfide resin and 50% by weight of glass beads.

8. A valve assembly as claimed in claim 4 wherein said valve body or said valve seat is constructed from a synthetic resin comprising approximately 60% by weight of polyetheretherketone, 20% by weight of carbon fiber and 20% by weight of mica.

9. A valve assembly comprising a valve seat formed with inlet passages, a valve body kept in sliding contact with said valve seat and formed with flow passages, said flow passages and said inlet passages being brought into and out of communication with each other by sliding said valve body with respect to said valve seat, characterized in that said valve seat and said valve body are made of synthetic resins having no adhesiveness to each other, wherein said valve body or said valve seat is constructed from a synthetic resin comprising approximately 60% by weight of polyphenylene sulfide resin, 20% by weight of carbon fiber and 20% by weight of mica.

10. A valve assembly comprising a valve seat formed with inlet passages, a valve body kept in sliding contact with said valve seat and formed with flow passages, said flow passages and said inlet passages being brought into and out of communication with each other by sliding said valve body with respect to said valve seat, characterized in that said valve seat and said valve body are made of synthetic resins having no adhesiveness to each other, wherein said valve body or said valve seat is constructed from a synthetic resin comprising approximately 50% by weight of polyphenylene sulfide resin and 50% by weight of glass beads.

11. A valve assembly comprising a valve seat formed with inlet passages, a valve body kept in sliding contact with said valve seat and formed with flow passages, said flow passages and said inlet passages being brought into and out of communication with each other by sliding said valve body with respect to said valve seat;

wherein at least one of said valve seat and said valve body is constructed from a synthetic resin that is swollen with oil prior to construction of said at least one of said valve seat and said valve body, and has a sliding surface in the form of a smoothly curved crowing or a smoothly flat surface; and wherein said oil comprises silicone oil.

12. A valve assembly comprising a valve seat formed with inlet passages, a valve body kept in sliding contact with said valve seat and formed with flow passages, said flow passages and said inlet passages being brought into and out of communication with each other by sliding said valve body with respect to said valve seat;

wherein at least one of said valve seat and said valve body is constructed from a synthetic resin that is swollen with oil prior to construction of said at least one of said valve seat and said valve body, and has a sliding surface in the form of a smoothly curved crowing or a smoothly flat surface; and wherein said oil comprises fluorinated oil.

13. A valve assembly comprising a valve seat formed with inlet passages;

a valve body kept in sliding contact with said valve seat and formed with flow passages;

wherein said flow passages and said inlet passages being brought into and out of communication with each other by sliding said valve body with respect to said valve seat; and wherein said valve seat is constructed from a pre-swollen synthetic resin with a sliding surface in the form of a smooth surface.

14. A valve assembly comprising a valve seat formed with inlet passages;

a valve body kept in sliding contact with said valve seat and formed with flow passages;

wherein said flow passages and said inlet passages being brought into and out of communication with each other by sliding said valve body with respect to said valve seat; and wherein said valve body is constructed from a pre-swollen synthetic resin with a sliding surface in the form of a smooth surface.

* * * * *